Aug. 18, 1953  G. W. CURTIS  2,648,987
VARIABLE-SPEED V-BELT TRANSMISSION
Filed Jan. 11, 1949  2 Sheets-Sheet 1

INVENTOR.
George W. Curtis
BY
ATTORNEYS.

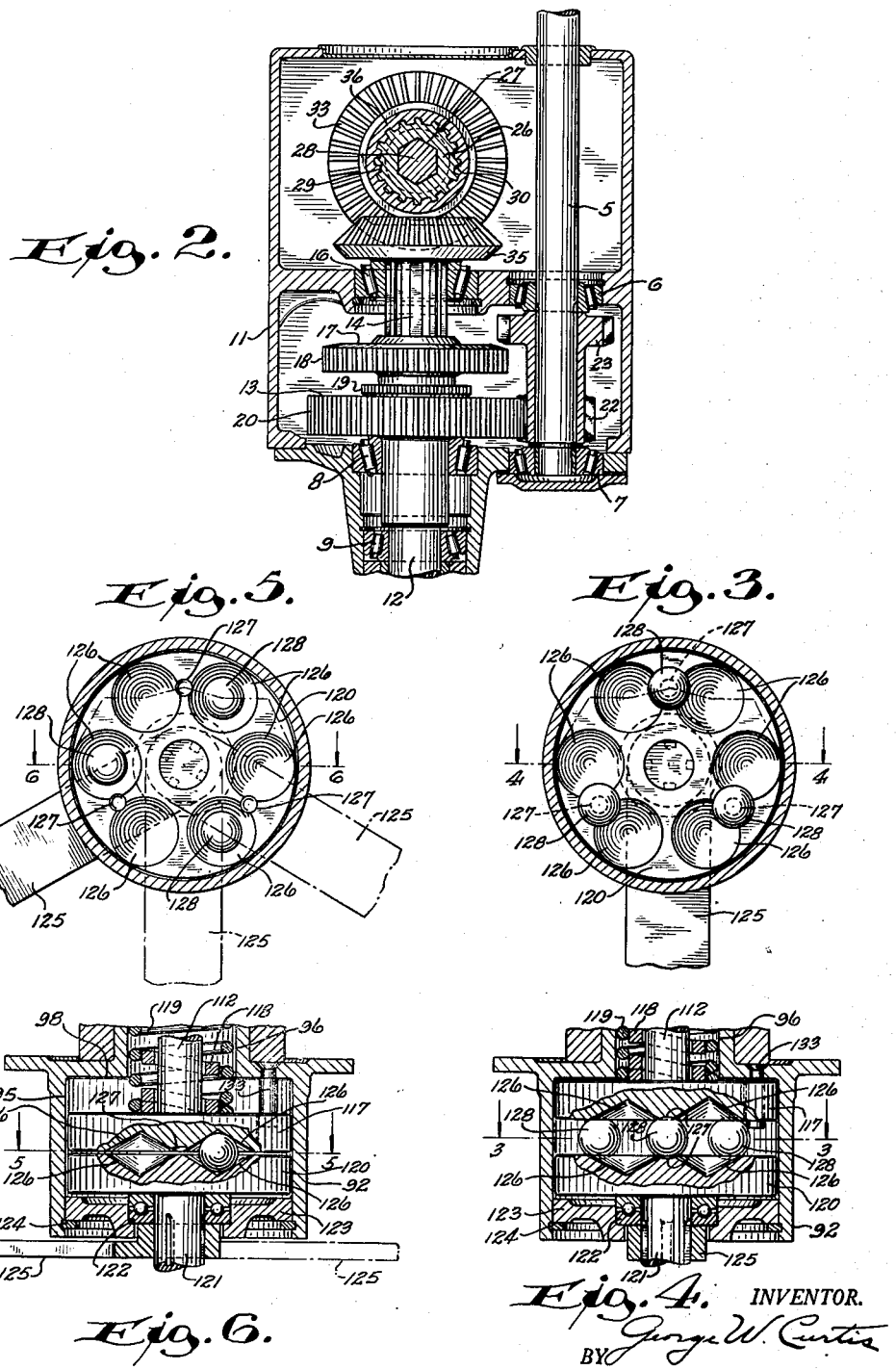

Patented Aug. 18, 1953

2,648,987

UNITED STATES PATENT OFFICE 2,648,987

VARIABLE-SPEED V-BELT TRANSMISSION

George W. Curtis, Wauwatosa, Wis.

Application January 11, 1949, Serial No. 70,313

16 Claims. (Cl. 74—230.17)

1

This invention relates to improvements in variable speed V-belt transmissions.

In general, variable speed V-belt transmissions operating on the principle of change in the effective diameters of the pulleys have heretofore used one or more springs in such a manner that they are greatly compressed at certain times and greatly extended at other times, thereby providing a widely variable spring pressure. This spring pressure is transmitted not only to the V-belt, but is also transmitted back to the control lever in such a way that the operator is required to overcome this pressure in order to move the control lever to obtain a desired speed change.

Overcoming the compression of the springs subjects the operator to considerable fatigue and thereby makes it difficult for him to control the apparatus efficiently for prolonged periods. In addition, the compression and extension of the springs causes variations in the side pressures exerted on the V-belt and results in rapid wear thereof.

It is, therefore, a general object of the invention to provide an improved V-belt transmission wherein the speed of the driven pulley may be quickly and effortlessly changed.

A further object of the invention is to provide a transmission of the class described wherein the V-velt is subjected to the same side pressures from both the driving and the driven pulleys, this being made possible by a yieldable member which acts against a movable portion of the driving pulley and reacts against a movable portion of the driven pulley with substantially equal force.

A further object of the invention is to provide a transmission of the class described wherein V-belt wear is greatly reduced by the maintenance of constant side pressures on said belt throughout the entire range of speeds.

A further object of the invention is to provide a transmission of the class described having a control lever which is divorced from that yieldable member which creates the side pressures on the belt, thereby eliminating the necessity of the operator overcoming the pressures exerted by the yieldable member in controlling the speed of the driven pulley.

A further object of the invention is to provide a V-belt transmission of the class described wherein the belt circumscribes all control parts in a manner to permit a quick and easy removal and replacement of said belts.

A further object of the invention is to provide a power takeoff which is available at all times, and which is separate from the vehicle propelling control.

A further object of the invention is to provide a V-belt transmission of the class described having a pair of vehicle propelling control levers for readily varying the speed of the driven shafts of said transmission between zero and a predetermined maximum, and having means associated wtih said control levers for selectively locking said levers in neutral position without interrupting the drive for the power takeoff.

A further object of the invention is to provide a pair of collateral V-belt drives having a compact laterally disposed assembled relationship, the construction being particularly well adapted for use in a vehicle having a variable width tread by reason of the fact that it permits a wider variation in tread width from minimum to maximum.

In the drawings accompanying and forming a part of this specification, wherein is shown one complete embodiment of the preferred form of the invention, and wherein the same reference characters indicate the same parts in all of the views;

Fig. 2 is a vertical sectional view taken along the line 2—2 of Fig. 1;

Fig. 3 is an enlarged vertical sectional view taken approximately along the line 3—3 of Figs. 1 and 4;

Fig. 4 is an enlarged fragmentary sectional view taken along the line 4—4 of Fig. 3;

Figure 1:
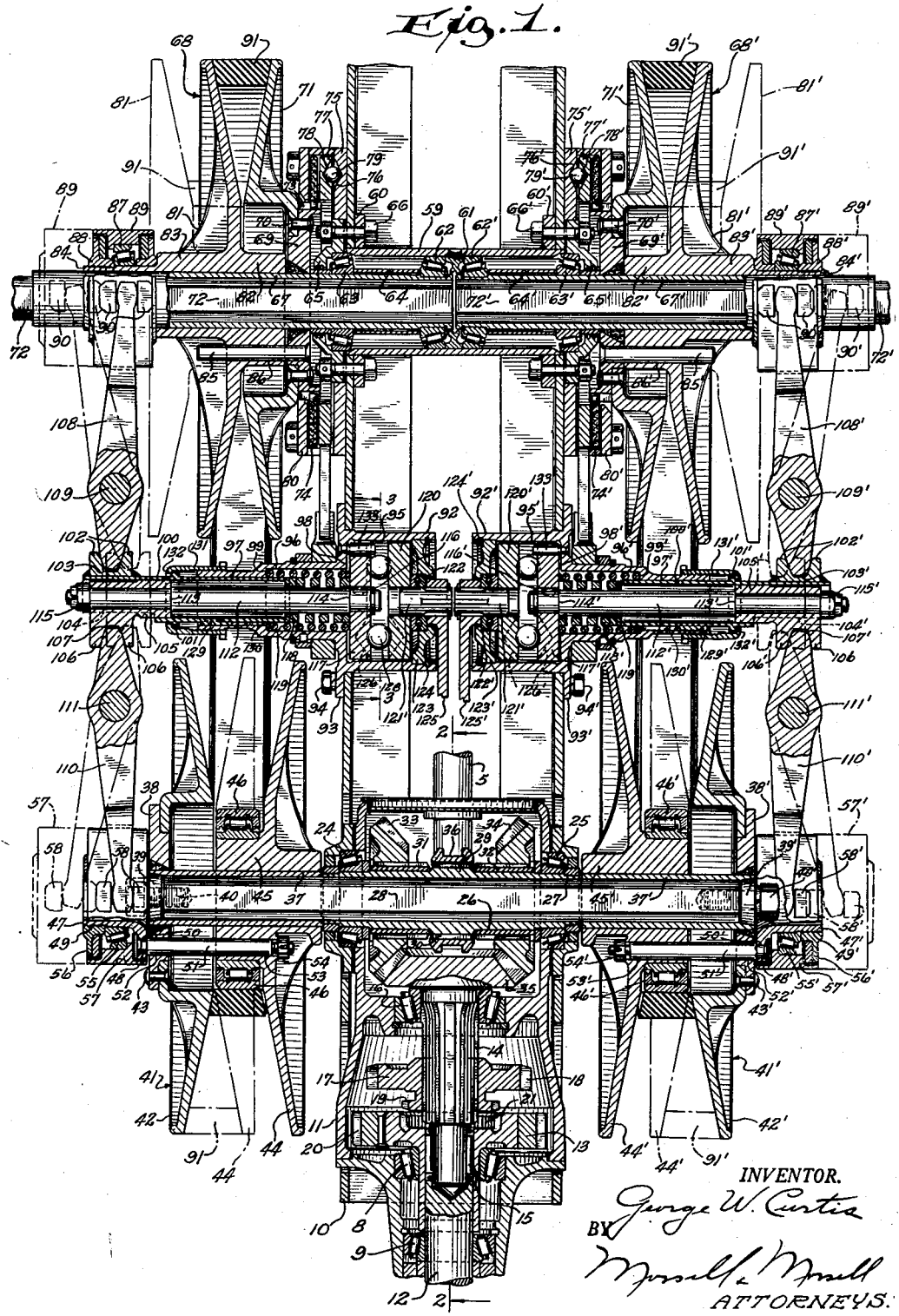
Fig. 1 is a horizontal sectional view of the improved variable speed V-belt transmission with its component parts in neutral position.

Fig. 5 is a view similar to Fig. 3 but showing the cam disc rotated approximately 45° in a clockwise direction from its neutral position of Fig. 3 to cause the balls to become seated in the cam recesses; and Fig. 6 is a view similar to Fig. 4 taken along the line 6—6 of Fig. 5, and showing the cam discs in close relationship as a result of the rotation thereof from their neutral position shown in Figs. 1, 3 and 4.

Referring to Figs. 1 and 2 of the drawings, the numeral 10 indicates a structural member which forms a part of the frame of a vehicle, such as a tractor, in which the invention may be incorporated. Supported by the frame member 10 is a gear transmission housing 11. A drive shaft 5 is driven by an engine (not shown) through a clutch (also not shown) and is journalled in bearings 6 and 7. Directly above and parallel with the shaft 5 is a shaft 12 which is journalled in bearings 8 and 9 and carries gear 13. A stub shaft 14 coaxial with the shaft 12 is journalled at one end in a suitable bearing 15 in the hub of the shaft 13 and is journalled adjacent the other end in a bearing 16 mounted in the casing 11. Axially slidably mounted on the shaft 14, and in splined relationship therewith, is a gear 17 which is formed with external gear teeth 18 as well as external jaw clutch teeth 19. The gear 13 is formed with external gear teeth 20, as well as internal jaw clutch teeth 21, the latter being adapted to coact with the external jaw clutch teeth 19 of the gear 17 upon sliding movement of the gear 17 with engagement with the gear 13.

A pair of integral spaced gears 22 and 23 are fixed on shaft 5. The gear 13 is permanently in mesh with the gear 22. The teeth 18 of the gear 17 are engageable with the teeth of the gear 23 upon sliding movement of the gear 17 into engagement with the gear 23. It is apparent that the gear arrangement provides a means for driving the shaft 14 at two different speeds while driving the shaft 12 at a constant speed. Shaft 12 may project exteriorly of the casing 11 to function as a power take-off. The subject matter disclosed in Fig. 2 and described herein is being claimed in my copending application, Serial No. 179,303, filed August 14, 1950, as a division of my application Serial No. 610,538 which has issued as Patent No. 2,529,489.

Journalled at its ends in bearings 24 and 25 and mounted in the sidewalls of the casing 11 is a transverse tubular shaft 26. The shaft 26 is formed with a hexagonal axial internal bore 27 in which is positioned a hexagonal shaft 28 of substantially the same cross-sectional dimension. The tubular shaft 26 is formed in its central portion with an external annular shoulder 29 formed with splines 30. On opposite sides of the shoulder 29 a pair of sleeves 31 and 32 are rotatably mounted on the shaft 26, said sleeves being formed with external splines of the same dimensions as the splines 30 on the shoulder 29.

A bevelled gear 33 is splined to the sleeve 31, and a bevelled gear 34 is splined to the sleeve 32. The gears 33 and 34 are both in constant mesh with a bevelled gear 35 fixed to the end of the shaft 14. A slidable clutch collar 36, which is splined to the shoulder 29, is movable axially into selective engagement with the splines of either the sleeve 31 or the sleeve 32 to provide a reversible drive for the shaft 28 from the shaft 14.

The opposite ends of the hexagonal shaft 28 project exteriorly of the casing 11 as shown in Fig. 1. Tubular members or sleeves 37 and 37' each having a hexagonal axial bore of substantially the same cross-sectional dimensions as the shaft 28 and having smooth cylindrical outer surfaces are positioned on the outer ends of the shaft 28 and have a driving fit thereon. Annular flanges 38 and 38' are preferably welded on the outer ends of the tubular members 37 and 37' respectively as shown. The tubular members 37 and 37' are held in position in the shaft 28 by tapered collars 39, 39' which have a tight fit within the outer ends of said collars, and which are held against the outer ends of the shaft 28 by cap screws 40, 40'.

Variable width V-belt pulleys 41, 41' comprise side members 42, 42' (which are fixed respectively to the flanges 38, and 38', as by rivets 43, 43') and opposite movable side members 44, 44'. The movable pulley side members 44, 44' are formed with hub portions 45, 45' having circular axial bores which slidably embrace the exterior surfaces of the tubular members 37, 37'. Mounted on the external peripheries of the hubs 45, 45' are suitable bearing members such as the roller bearing members 46, 46'.

Sleeve members 47, 47', formed with outwardly projecting annular flanges 48, 48' at one end, and with external screw threads 49, 49' at the opposite end, are placed with the flanges 48, 48' adjacent the flanges 38, 38' and coaxial therewith. The flanges 48, 48' are formed with a series of apertures 50, 50' in which are fixed, as by riveting or welding, the reduced end portion of elongated bolts 51, 51'. The bolts 51, 51' slidably extend, in a direction parallel with the pulley axis, through apertures 52, 52' in the flanges 38, 38', and through apertures 53, 53' in the hubs 45, 45' of the movable pulley sides. Nuts 54, 54' are threaded onto the inner ends of the bolts 51, 51'.

Mounted on the sleeve members 47, 47' are thrust bearings 55, 55' which are held in position by suitable nuts 56, 56' carried by the threaded end of said sleeve member. Annular housings 57, 57', provided with suitable seal members, surround the bearings 55, 55', and the sleeve members 47, 47' are freely rotatable relative thereto. The housings 57, 57' are each formed with two diametrically opposed pairs of spaced lugs or bosses 58, 58'.

Spaced from the casing 11 and extending transversely through and between the sides of the frame 10 is a tubular housing 59. The housing 59 is formed adjacent its ends with integral outwardly projecting annular flanges 60, 60' which engage the inner faces of the sides of the frame 10. An integral internal positioning and spacing collar 61 is positioned centrally of the housing 59, and in engagement with the opposite sides of the collar 61 are bearings 62, 62'. Positioned partly in the outer ends of the housing 59 are bearings 63, 63' which are held in spaced relation to the bearings 62, 62' by tubular spacers 64, 64'. Also supporting the bearings 63, 63' are annular bearing caps 65, 65' which, together with the housing 59, are held in assembled position relative to the frame 10 by means of the bolts 66, 66'.

Journalled in the bearings 62 and 63 and 62' and 63' are tubular stub shafts 67, 67' which have cylindrical outer surfaces and hexagonal bores. The tubular stub shafts 67, 67' extend outwardly beyond the frame 10 and carry at their outer ends variable width V-belt pulleys 68, 68'. Having inner end portions axially slidable within the stub shafts 67 and 67' respectively, and in driving engagement therewith, are hexagonal drive shafts 72, 72' which may independently drive vehicle propelling members (not shown) in any desired manner.

Fixed to the exterior of the tubular shafts 67, 67', as by welding, outwardly adjacent the bearing caps 65, 65' are outwardly projecting annular flange members 69, 69'. Fixed to the flange members 69, 69', as by rivets 70, 70', are fixed side portions 71, 71' of the pulleys 68, 68'.

Any suitable brake mechanism may be associated with the pulleys 68, 68' or the stub shafts 67, 67' such as, for example, the brake mechanism disclosed in my copending application, Serial No. 775,705, filed on September 23, 1947, now Patent No. 2,582,966, January 22, 1952, or the brake mechanism disclosed in the drawings herein which will now be described.

The flange members 69, 69' are formed with peripheral teeth 73, 73' which are in splined relationship with teeth formed on the inner peripheral edges of annular friction rings 74, 74' thereby creating a driving engagement between the flanges 69, 69' and said friction rings.

Fixedly mounted on the outer surfaces of the frame 10 coaxial with the shafts 67, 67' are control rings 75, 75' which are formed with a series of outwardly facing conical cam recesses 76, 76'. Positioned between the rings 74 and 75 and 74' and 75', and suitably rotatably supported, are movable control rings 77, 77' which are formed with a series of inwardly facing conical cam recesses 78, 78', said recesses being positioned to normally register with the recesses 76, 76'. Rollable members 79, 79' are positioned in the cavity formed by each pair of registering cam recesses. Annular rings 80, 80' are fixed, as by bolting to the frame 10, outwardly adjacent the friction rings 74.

It is apparent that upon rotation of the control rings 77, 77' relative to the control rings 75, 75' by suitable levers (not shown), the coaction of the balls 79, 79' with the cam recesses forces the rings 77, 77' outwardly and causes the friction rings 74, 74' to be subjected to compressive forces between the rings 80 and 77 and 80' and 77' respectively. This compressive force acts to stop the pulleys 68, 68' because of the friction created.

Slidably mounted on the cylindrical exterior surfaces of the stub shafts 67, 67' are movable side members 81, 81' of the pulleys 68, 68'. The members 81, 81' are formed with inwardly projecting hub portions 82, 82', and with outwardly projecting hub portions 83, 83'. Tubular extensions 84, 84' of reduced outside diameter are formed on the hub portions 83, 83'. A series of bolts or pins 85, 85' are fixed to and extend through the flanges 69, 69' and project outwardly parallel with the axis of the shafts 67, 67'. The bolts 85, 85' slidably project through suitable apertures 86, 86' in the hub portions 82, 82', so that the side members 81, 81' can move axially, but not rotatably, relative to the fixed pulley side members 71, 71'.

Thrust bearings 87, 87' are positioned on the tubular extensions 84, 84', and are held in place by nuts 88, 88' threaded on the outer ends of said extensions. Annular housings 89, 89', provided with suitable sealing means, enclose the bearings 87, 87' and are each formed with two diametrically opposed pairs of spaced lugs or bases 90, 90'.

An endless V-belt 91 connects the pulleys 68 and 41, and has its side walls in engagement with the inner surfaces of the side members 71 and 81 of the pulley 68 and with the inner surfaces of the side members 42 and 44 of the pulley 41. The inner surface of the V-belt 91 engages the bearing 46 when the pulley 41 is spread to the neutral position shown in Fig. 1. An endless V-belt 91' is associated with the pulleys 68' and 42' in the same manner as the belt 91 is associated with the pulleys 68 and 42.

Fixed to opposite side portions of the frame 10, and equally spaced from the axes of the tubular housing 59 and of the shaft 28, are tubular housings 92, 92'. The housings 92, 92' are formed with external attaching flanges 93, 93' which are secured to the frame 10 through a series of bolts 94, 94'. The housings 92, 92' are formed with coaxial bores 95, 95', 96, 96' and 97, 97' of different diameters which form internal shoulders 98, 98' and 99, 99'.

Sleeve members 100, 100' have their inner ends telescopically mounted within the bores 97, 97' of the housings 92, 92'. The sleeves 100, 100' are formed with external annular shoulders 101, 101' intermediate their length. Threaded on the outer end of the casing 92, 92' are sleeve members 131, 131' which are formed with inwardly projecting annular stop flanges 132, 132'. The flanges 132, 132' are positioned axially outwardly of the flanges 101, 101' of the sleeves 100, 100', and the outward axial movement of the sleeves 100, 100' is limited by engagement of the flanges 101, 101' with the flanges 132, 132'. The axial position of the flanges 132, 132', however, may be varied by adjusting the position of the sleeve 131 on the threaded end of the casings 92, 92'.

Near their outer ends and extending only a short distance on the periphery the sleeves 100, 100' are formed with integral forks 102, 102' having recesses 103, 103' therebetween. The outer ends of the sleeves 100, 100' have side wall portions diametrically opposite the forks 102, 102' which are cut away as at 104, 104'. In addition, the sleeves 100, 100' are formed with integral keys 129, 129' which are slidably positioned in keyways 130, 130' formed in the bores 97, 97' of the housings 92, 92'. Bushing members 105, 105' are telescopically slidable in the outer ends of the sleeves 100, 100' and are formed with spaced forks 106, 106' having recesses 107, 107'. The forks 106, 106' project out through the cut-away portions 104, 104' in the sleeves 100, 100' and are movable axially therein.

Levers 108, 108', having one end positioned in the recesses 103, 103' between the lugs 102, 102' and having their opposite ends bifurcated and positioned between the lugs or bosses 90, 90' of the housings 89, 89', are suitably pivotally mounted as at 109, 109'. Levers 110, 110', which are substantially identical with the levers 108, 108', have one end positioned in the recesses 107, 107' and have their opposite ends bifurcated and positioned between the lugs or bosses 58, 58' of the housings 57, 57'. The levers 108, 108' are suitably pivotally mounted as at 111, 111'.

The bushing members 105, 105' are preferably mounted on round shafts 112, 112' having intermediate portions of enlarged diameter forming shoulders 113, 113' and 114, 114'. The bushing members 105, 105' are rigidly held in engagement with the shoulders 113, 113' by nuts 115, 115' threaded on the outer ends of the shafts 112, 112'. Keyed to the inner end of the shafts 112, 112' and held in engagement with the shoulders 114, 114' by snap rings 116, 116' are cam discs 117, 117'. Pins 133, 133' projecting inwardly from the shoulders 98, 98' and coacting with a notch formed in the periphery of each of the discs 117, 117' prevent rotation of said discs while permitting axial movement thereof.

Surrounding the shafts 112, 112' and disposed under a predetermined amount of end compression between the discs 117, 117' and the inner ends of the sleeve members 100, 100' are helical springs 118, 118'. Surrounding the springs 118, 118', and disposed within the bores 96, 96' between the shoulders 99, 99' and the discs 117, 117' are preferably very light helical springs 119, 119'.

Positioned within the bores 95, 95' of the casings 92, 92', parallel and coaxial with the discs 117, 117' are the discs 120, 120'. The discs 120, 120' are provided with integral axially inwardly projecting short shafts 121, 121' having splined inner ends. The discs 120, 120' abut thrust bearings 122, 122' which surround the shafts 121, 121' and are held in place by bearing caps 123, 123'. The bearing caps 123, 123' are, in turn, held in position by snap rings 124, 124'. Fixed to the splined ends of the shafts 121, 121' are control levers 125, 125'.

Each of the discs 117, 117', 120 and 120' are preferably formed with identical sets of three pair of conical recesses 126, 126' of the type shown most clearly in Figs. 3 and 5. As shown in Figs. 3, 4 and 5, between each pair of conical recesses 126 the cam discs are formed with smaller concave depressions 127. When the apparatus is in the neutral position shown in Fig. 1, all of the recesses in the discs 117, 117' face toward and are alined with all of the recesses in the discs 120, 120'. Positioned in each pair of oppositely facing depressions 127, as shown in Figs. 3 and 4, is a ball 128. The balls 128 in this position act as spacing means to hold the discs 117 and 120 and 117' and 120' apart, and the concavity of the depressions 127 coacts with said balls and with the springs 119, 119' (which urge the discs 117, 117' together) to provide the necessary stability to maintain this neutral position of the discs and of the control levers 125, 125' as long as desired. The discs 120, 120' are thus, in effect, locked against turning, and the springs 119, 119' are held in a position wherein they can cause no movement of the shaft 112 or of the sleeve 100.

In describing the operation of the invention the mechanism on one side of the apparatus only will be referred to. However, it is apparent that the mechanism on the opposite side of the apparatus operates in an identical manner.

As has been indicated, Figs. 1, 3 and 4 show the apparatus in neutral position. The disc 117 is spaced by the balls 128 in its outermost position relative to the disc 120. When the disc 117 is in its outermost position, the shaft 112 is correspondingly in its outermost position. Through the fork 106 the shaft 112 positions the lever 110 so that through the lugs 58, through the bearing housing 57, through the bearing 55, through the tubular member 47, and through the bolts 51, the movable side member 44 of the pulley 41 is positioned in its innermost position as shown. As also shown in Fig. 1, the movable side member 44 of the pulley 41, when in its innermost position, is out of contact with the side of the belt 91 and, therefore, the pulley 41 does not have a driving connection with said belt when in this position.

When the disc 117 is in its outermost position, it acts through the spring 118 to hold the sleeve 100 in its outermost position. The outermost position of the sleeve 100 is determined by the position of the flange 132 on the adjustable sleeve 131 since the flange 101 of the sleeve 100 is urged by the spring 118 into contact with the flange 132. When the sleeve 100 is in its outermost position, the fork 102 thereon positions the lever 108 as shown. The lever 108, in turn, acting through the lugs 90, through the bearing housing 89, and through the bearing 87, positions the movable side member 81 of the pulley 68 in its innermost position as shown in Fig. 1. In this position the belt 91 is in driving engagement with the pulley 68 adjacent the periphery thereof. It is apparent, however, that while the pulley 68 and the belt 91 are in driving engagement in this neutral position, no motion is imparted to the pulley 68 by said belt because the belt is not being driven by the pulley 41. Since no motion is imparted to the pulley 68 in the position of Fig. 1, there is no motion imparted to the tubular shaft 67 by said pulley, and the propelling member (such as the propelling members of a tractor) driven by said shaft will not be moved.

Referring to Figs. 3, 4, 5 and 6, it is apparent that upon rotation of the control lever 125 in either direction from its neutral position, the disc 120 will rotate relative to the disc 117, and each of the balls 128 will move out of the depressions 127 and into the adjacent larger recess 126, travelling in the direction of the rotation of the disc 120 in so doing. This movement of the balls 128 permits the disc 117 to move axially inwardly toward the disc 120. The innermost position of the disc 117 is shown in Fig. 6, wherein the balls 128 are shown seated in facing pairs of recesses 126. The balls 128 act as rollable cam members, and since there are two recesses (one on each side of the depressions 127) for each ball 128, any desired spacing of the disc 117 relative to the disc 120 between the positions thereof shown in Figs. 4 and 6 may be accomplished by moving the control lever 125 the necessary amount in either direction from the neutral position of Figs. 1, 3 and 4.

As the control lever 125 is rotated from the neutral position of Figs. 1, 3 and 4, toward the position shown in Figs. 5 and 6 and the disc 117 starts moving inwardly toward the disc 120, the shaft 112 moves inwardly with the disc 117. The fork 106 on the shaft 112 moves the lever 110 in a clockwise direction as the shaft 112 moves inwardly, and through the mechanism previously described, the lever 110 moves the movable pulley side member 44 outwardly into driving engagement with the belt 91. Rotative power is now transmitted from the shaft 5 through the gear transmission, the driving pulley 41, the belt 91, and the driven pulley 68 to the shaft 72. Since the belt 91 is adjacent the hub of the pulley 41 and is adjacent the periphery of the pulley 68, the pulley 68 is being driven slower than the pulley 41.

While the disc 117 is being moved inwardly under the expanding influence of the springs 118 and 119 and while it is causing the movable portion 44 of the pulley 41 to move toward the belt 91, the spring 118 simultaneously becomes elongated until the pulley member 44 contacts the belt 91. The sleeve 131 is so positioned that at the instant the belt 91 is engaged by the side 44 of the pulley 41, the pressures exerted by the spring 118 outwardly against the sleeve 100 is substantially equal to the pressure said spring exerts against the disc 117. Hence, when the pulley side 44 drivingly engages the belt 91, substantially no pressure is exerted by the stop flange 101 of the sleeve 100 against the flange 132 of the sleeve 131. Further inward movement of the disc 117, upon rotation of the disc 120, is caused by the expanding pressures of the light spring 119 only, and as said disc moves inwardly, the spring 118 and the sleeve 100 move inwardly therewith, moving the flange 101 out of contact with the flange 132.

It is apparent that when the belt 91 is engaged by both the pulley 41 and the pulley 68, the pressures exerted by the movable side portions of both of said pulleys are substantially equal. This is because the pressures exerted by said pulley side members are derived from the same source, namely the spring 118. The spring 118, in effect, floats in the system, one end exerting pressures inwardly against the disc 117, and through the lever 110 urging the side member 44 of the pulley 41 against the belt 91; and the other end exerting pressures outwardly against the sleeve 100 and through the lever 108 urging the side member 81 of the pulley 68 against the belt 91.

With the belt 91 so engaged by the pulleys 41 and 68, inward movement of the disc 117, upon rotation of the disc 120, simultaneously moves the shaft 112 and the sleeve 100 inwardly. Simultaneously, with the inward movement of the shaft 112 and the sleeve 100, the movable member 81 of the pulley 68 moves outwardly to widen the space between said member and the fixed pulley member 71, and the movable member 44 of the pulley 41 moves outwardly to narrow the space between said member and the fixed pulley member 42. In response to this adjustment in the width of the pulleys 41 and 68, the belt 91 moves radially inwardly toward the hub of the pulley 68 while at the same time said belt is urged radially outwardly away from the hub of the pulley 42. The extremes of this movement are indicated by the dot and dash lines of Fig. 1. This movement of the belt speeds up the pulley 68 relative to the pulley 41 due to the increase in the effective radius of the pulley 42 relative to that of the pulley 68. Regardless of what the relative relationship of the effective radii of the pulleys may be, however, the spring 118 continues to cause the same side pressures to be exerted on the belt 91 by both pulleys when the pulley 68 is being driven. This eliminates the extremes in side pressures which are exerted on the belts of conventional V-belt drives, said extremes being one of the greatest causes of V-belt wear.

When it is desired to slow down the speed of the pulley 68 relative to the pulley 41, it is only necessary to move the control lever 125 in a reverse direction toward its neutral position. This causes the mechanism to move toward the full line position of Fig. 1. As the sleeve 100 and the shaft 112 move outwardly during this return movement, the flange 101 of the sleeve eventually contacts the flange 132 of the sleeve 131 and stops the inward travel of the pulley side 81 of the pulley 68 at the solid line position shown in Fig. 1. The shaft 112, however, not being restrained by said flanges continues to move outwardly and moves the side member 44 of the pulley 41 inwardly to a position out of contact with the belt 91, as shown in Fig. 1.

It is apparent that any desired ratio of pulley speeds within the limits of the apparatus can be provided by adjustment of the control lever 125. Due to the fact that in making this adjustment the only spring pressure which must be overcome is that of the light spring 119 upon outward movement of the disc 117, a vehicle embodying the improved transmission can be driven with very little effort on the part of the operator.

During the operation of a vehicle embodying the invention heavy tensions are created in the belt 91 which tend to pull said belt radially inwardly on the pulley 41. The spring 119 acting through the shaft 112 and the lever 110 is designed to offset a portion of this inward belt pull by forcing the movable pulley side 44 against the fixed side member 41, thereby imposing a slight radially outward force on the belt 91 tending to move said belt radially outwardly on the pulley 41. This action of the spring 119 is in addition to its other functions of maintaining a frictional contact between the discs 117 and 120 and the balls 128 and providing a lock in neutral when the balls 128 register in the depressions 127.

The provision of two cam recesses 126 for each ball 128 permits rotation of the disc 120 in either direction from the neutral position (wherein the balls 128 are seated in the depressions 127) to produce the same results in the movement of the cam 117 and its related parts. This feature is important because it permits the operator to be seated facing either end of the vehicle without requiring a different operating technique for each position.

Since the shafts 72 and 72' are slidable within the tubular shafts 67, 67', provision may readily be made for their quick and easy removal therefrom to permit removal of the belts 91, 91'. All of the control parts are circumscribed by the belts 91, 91', and said belt may therefore be easily removed from the pulleys 41 and 68 upon removal of the shafts 72, 72'.

Farm tractors are frequently used to pull another machine, such as a harvester, while at the same time supplying power through a power take-off to operate the machine being pulled. At times a machine of this type becomes choked up. By using a tractor having incorporated therein the improved transmission of the present invention, the speed of the tractor can be slowed down or, if desired, stopped, while the harvester is being driven at a constant speed through the power take-off and there is no necessity for disengaging the main drive shaft clutch when doing so.

When it is necessary to stop the tractor entirely, the control levers 125 will be locked in neutral position and the tractor will remain stationary as long as desired. This feature is particularly advantageous when incorporated in modern one-man operated equipment. The improved construction permits the operator to leave the driver's seat and to attend to the cleaning out of the harvesting machine while the harvester is being continuously driven through the power take-off.

It is intended that the improved variable speed V-belt transmission and the engine driving the same will be operated at approximately the middle point of their speed range when the vehicle in which they are incorporated is pulling average loads. Thus, when a change in draw bar load is encountered, the relative effective pulley radii can be varied to vary the torque multiplication of the transmission, and, at the same time, the accelerator of the engine can be adjusted accordingly to maintain the desired speed under the new conditions of draw bar load.

Various changes and modifications may be made without departing from the spirit of the invention, and all of such changes are contemplated, as will come within the scope of the claims.

What I claim is:

1. In a variable speed V-belt transmission a driving pulley formed with a peripheral groove and having a side member movable axially to vary the width of said driving pulley groove, a driven pulley formed with a peripheral groove and having a side member movable axially to vary the width of said pulley groove; an endless V-belt connecting said first and second pulleys; a pair of coaxial relatively rotatable and axially movable cam members normally in neutral position, a first relatively weak spring normally urging said cam members together; means between said cam members for controlling approaching movement thereof upon relative rotation of said cam members in either direction from their neutral position; a first lever means connected to the movable side member of said driving pulley and to one of said cam members; a second lever means connected to the movable side member of said driven pulley; and a second relatively strong spring acting against the cam member which is connected to said first lever means and acting against the second lever means to urge the movable side members of said pulleys against said belt with equal pressures.

2. In a variable speed V-belt transmission, a driving pulley formed with a peripheral groove and having a side member movable axially to vary the width of said driving pulley groove; a driven pulley formed with a peripheral groove and having a side member movable axially to vary the width of said pulley groove; an endless V-belt connecting said first and second pulleys; a pair of movable cam members normally in neutral position, one of said cam members being rotatable and the other of said cam members being axially slidable and non-rotatable; means normally urging said cam members together; means between said cam members for controlling approaching movement thereof upon relative rotation of said rotatable cam member in either direction from its neutral position; means including a first lever connected to the movable side member of said driving pulley and to said non-rotatable cam member for causing groove narrowing movement of the movable side member of the driving pulley upon approaching movement of said non-rotatable cam member; means including a second lever connected to the movable side member of said driven pulley and to said non-rotatable cam member for causing groove widening movement of the movable side member of the driven pulley upon approaching movement of said non-rotatable cam member, there being a normally compressed spring acting in opposite directions against said second lever and said non-rotatable cam member to urge the movable side members of said pulleys against the belt with equal pressures; and a manually controlled lever fixed to said rotatable cam member and mounted for movement in either of two directions from its neutral position to cause approaching movement of said non-rotatable cam member.

3. In a variable speed V-belt transmission, a driving pulley formed with a peripheral groove and having a side member movable axially to vary the width of said driving pulley groove; a driven pulley formed with a peripheral groove and having a side member movable axially to vary the width of said pulley groove; an endless V-belt connecting said first and second pulleys; a pair of movable cam members normally in neutral position, one of said cam members being rotatable and the other of said cam members being axially slidable and non-rotatable; spring means normally urging said cam members together; means between said cam members for controlling approaching movement thereof upon relative rotation of said rotatable cam member in either direction from its neutral position; means including a first lever connected to the movable side member of said driving pulley and to said non-rotatable cam member for causing groove narrowing movement of the movable side member of the driving pulley upon approaching movement of said non-rotatable cam member; means including a second lever connected to the movable side member of said driven pulley and to said non-rotatable cam member for causing groove widening movement of the movable side member of the driven pulley upon approaching movement of said non-rotatable cam member, there being a normally compressed spring acting in opposite directions against said second lever and said non-rotatable cam member to urge the movable side members of said pulleys against the belt with equal pressures; and a manually controlled lever fixed to said rotatable cam member and mounted for movement in either of two directions from its neutral position to cause approaching movement of said non-rotatable cam member.

4. In a variable speed V-belt transmission, a driving pulley formed with a peripheral groove and having a side member movable axially to vary the width of said driving pulley groove; a driven pulley formed with a peripheral groove and having a side member movable axially to vary the width of said pulley groove; an endless V-belt connecting said first and second pulleys; a pair of movable cam members normally in neutral position; one of said cam members being rotatable and the other of said cam members being axially slidable and non-rotatable; a relatively weak spring normally urging said cam members together; means between said cam members for controlling approaching movement thereof upon relative rotation of said rotatable cam member in either direction from its neutral position; means including a first lever connected to the movable side member of said driving pulley and to said non-rotatable cam member for causing groove narrowing movement of the movable side member of the driving pulley upon approaching movement of said non-rotatable cam member; means including a second lever connected to the movable side member of said driven pulley and to said non-rotatable cam member for causing groove widening movement of the movable side member of the driven pulley upon approaching movement of said non-rotatable cam member, there being a normally compressed relatively strong spring acting in opposite directions against said second lever and said non-rotatable cam member to urge the movable side members of said pulleys against the belt with equal pressures; and a manually controlled lever fixed to said rotatable cam member and mounted for movement in either of two directions from its neutral position to cause approaching movement of said non-rotatable cam member.

5. In a transmission having a pair of belt connected variable width pulleys each having a movable side member: a pair of coacting cam members formed with cam surfaces permitting movement of said cam members toward and away from each other upon relative transverse movement thereof; a first linkage connected to the movable side member of one of said pulleys and to one of said cam members; a second linkage connected to the movable side member of the other of said pulleys; and a yieldable member positioned to act in one direction against the cam member which is connected to said first linkage in a manner to urge the movable side member of the first-mentioned pulley in a groove narrowing direction, said yieldable member also being positioned to react with substantially equal force in the opposite direction against the second linkage in a manner to urge the movable side member of the other pulley in a groove narrowing direction, whereby said pulleys exert substantially equal side pressures on the belt.

6. In a transmission having a pair of belt connected variable width pulleys each having a movable side member: a pair of coacting cam members formed with cam surfaces causing movement of said cam members toward and away from each other upon relative transverse movement thereof; a first spring normally urging one of said cam members toward the other; a first linkage connecting the movable side member of one of said pulleys to said first mentioned cam member; a second linkage connected to the movable side member of the other of said pulleys; and a second spring positioned to act in one direction against said first-mentioned cam member in a manner to urge the movable side of the first-mentioned pulley in a groove narrowing direction, said second spring also being positioned to react with substantially equal force in the opposite direction against the second linkage in a manner to urge the movable side of the other pulley in a groove narrowing direction, whereby said pulleys exert substantially equal side pressures on the belt.

7. In a transmission having a pair of belt connected variable width pulleys each having a movable side member: a pair of coacting cam members formed with cam surfaces causing movement of said cam members toward and away from each other upon relative transverse movement thereof; a first relatively weak spring normally urging one of said cam members toward the other; a first linkage connecting the movable side member of one of said pulleys to said first-mentioned cam member; a second linkage connected to the movable side member of the other of said pulleys; and a second relatively strong spring positioned to act in one direction against said first-mentioned cam member in a manner to urge the movable side of the first-mentioned pulley in a groove narrowing direction, said second spring also being positioned to act with substantially equal force against the second linkage in a manner to urge the movable side of the other pulley in a groove narrowing direction, whereby said pulleys exert substantially equal side pressures on the belt.

8. In a transmission having a pair of belt connected variable width pulleys each having a movable side member; a pair of coacting cam members formed with cam surfaces for causing movement of one of said cam members toward and away from the other within a predetermined range in response to relative transverse movement of said cams; a first linkage connected to the first of said cam members and to the movable side member of one of said pulleys in a manner to move said movable side member in a groove widening direction out of contact with the belt when the first cam is moved in a spreading direction a predetermined amount less than the maximum limit of said range; a second linkage connecting said first cam member to the movable side member of the other of said pulleys in a manner to move said movable side in a groove narrowing direction when the first cam is moved in a spreading direction, said second linkage including a yieldable member; means for stopping the groove narrowing movement of the second linkage upon spreading movement of the first cam member said predetermined amount, whereby movement of said first cam member to maximum spread-apart position causes deformation of said yieldable member and movement of the movable side member of the first pulley out of driving contact with the belt.

9. In a transmission having a pair of belt connected variable width pulleys each having a movable side member: a pair of coacting cam members formed with cam surfaces for causing movement of one of said cam members toward and away from the other within a predetermined range in response to relative rotative movement of said cams; a first linkage connected to the first of said cam members and to the movable side member of one of said pulleys in a manner to move said movable side member in a groove widening direction out of contact with the belt when the first cam is moved in a spreading direction a predetermined amount less than the maximum limit of said range; a second linkage connecting said first cam member to the movable side member of the other of said pulleys in a manner to move said movable side in a groove narrowing direction when the first cam is moved in a spreading direction, said second linkage including a spring member; means for stopping the groove narrowing movement of the second linkage upon spreading movement of the first cam member said predetermined amount, whereby movement of said first cam member to maximum spread-apart position causes deformation of said spring member and movement of the movable side member of the first pulley out of driving contact with the belt.

10. In a variable speed V-belt transmission: a driving pulley formed with a peripheral groove and having a side member movable axially to vary the width of the said driving pulley groove; a driven pulley formed with a peripheral groove and having a side member movable axially to vary the width of said pulley groove; an endless V-belt connecting said first and second pulleys; a pair of coacting cam members formed with cam surfaces shaped to cause movement of one of said cam members toward and away from the other upon relative transverse movement of said cam members; a first relatively weak spring normally urging said cam members together; a first linkage connected to the movable side member of said driving pulley and to one of said cam members; a second linkage connected to the movable side member of said driven pulley, one of said linkages including a second relative strong spring positioned to act in one direction to urge the movable side of one of said pulleys in a groove narrowing direction and to act in the opposite direction with substantially equal force to urge the movable side member of the other pulley in a groove narrowing direction, whereby the movable side members of said pulley are urged against said belt with substantially equal pressures.

11. In a transmission having a pair of belt connected variable width pulleys, each having a movable side member: a pair of coacting cam members formed with cam surfaces permitting movement of said cam members toward and away from each other upon transverse movement thereof; linkage connecting one of said cam members to the movable side member of each of said pulleys, said linkage including a yieldable member positioned to act in one direction to urge the movable side member of one of said pulleys in a groove narrowing direction and to react in the opposite direction with substantially equal force to urge the movable side member of the other pulley in a groove narrowing direction, whereby said pulleys exert substantially equal side pressures on the belt.

12. In a transmission having a pair of belt connected variable width pulleys, each having a movable side member: a pair of coacting cam members formed with cam surfaces permitting movement of said cam members toward and away from each other upon transverse movement thereof; linkage connecting one of said cam members to the movable side member of each of said pulleys; said linkage including a spring positioned to act in one direction to urge the movable side member of one of said pulleys in a groove narrowing direction and to react in the opposite direction with substantially equal force to urge the movable side member of the other pulley in a groove narrowing direction, whereby said pulleys exert substantially equal side pressures on the belt.

13. In a transmission having a pair of belt connected variable width pulleys each having a movable side member: a pair of coacting cam members formed with cam surfaces permitting movement of said cam members toward and away from each other upon relative transverse movement thereof; a first linkage connected to the movable side member of one of said pulleys and to one of said cam members; a second linkage connected to the movable side member of the other of said pulleys; and a spring positioned to act in one direction against the cam member which is connected to said first linkage to urge the movable side member of the first-mentioned pulley in a groove narrowing direction to react with substantially equal force in the opposite direction against the second linkage to urge the movable side member of the other pulley in a groove narrowing direction, whereby said pulleys exert substantially equal side pressures on the belt.

14. In a transmission having a pair of belt connected variable width pulleys each having a movable side member; a pair of coacting cam members formed with cam surfaces causing movement of said cam members toward and away from each other upon relative transverse movement of said cam members; a first spring normally urged one of said cam members toward the other; linkage connecting one of said cam members to the movable side member of each of said pulleys; said linkage including a second spring positioned to act in one direction to urge a movable side member of one of said pulleys in a groove narrowing direction and to react in the opposite direction with substantially equal force to urge the movable side member of the second pulley in a groove narrowing direction, whereby said pulleys exert substantially equal side pressures on the belt.

15. In a transmission having a pair of belt connected variable width pulleys each having a movable side member; coacting first and second cam members formed with cam surfaces for causing movement of the first cam member toward and away from the second within a predetermined range in response to relative transverse movement of said cams; linkage connected to said first cam member and to the movable side members of said pulleys in a manner to move the movable side member of one of said pulleys in a groove widening direction out of contact with the belt when the first cam is moved in a spreading direction a predetermined amount less than the maximum limit of said range, and in a manner to move the movable side member of the other of said pulleys in a groove narrowing direction when said first cam is moved in a spreading direction; said linkage including a yieldable member; and means for stopping the groove narrowing movement of the second pulley upon spreading movement of the first cam member said predetermined amount, whereby movement of said first cam member to its maximum spread-apart position causes deformation of said yieldable member and movement of the movable side member of the first pulley out of driving contact with the belt.

16. In a transmission having a pair of belt connected variable width pulleys each having a movable side member; coacting first and second cam members formed with cam surfaces for causing movement of the first cam member toward and away from the second within a predetermined range in response to relative transverse movement of said cams; linkage connected to said first cam member and to the movable side members of said pulleys in a manner to move the movable side member of one of said pulleys in a groove widening direction out of contact with the belt when the first cam is moved in a spreading direction a predetermined amount less than the maximum limit of said range, and in a manner to move the movable side member of the other of said pulleys in a groove narrowing direction when said first cam is moved in a spreading direction, said linkage including a spring; and means for stopping the groove narrowing movement of the second pulley upon spreading movement of the first cam member said predetermined amount, whereby movement of said first cam member to its maximum spread-apart position causes deformation of said spring and movement of the movable side member of the first pulley out of driving contact with the belt.

GEORGE W. CURTIS.

References Cited in the file of this patent

UNITED STATES PATENTS

| Number | Name | Date |
|---|---|---|
| 1,588,832 | Young | June 15, 1926 |
| 1,728,482 | Fischer | Sept. 17, 1929 |
| 1,953,360 | Moree | Apr. 3, 1934 |
| 1,993,547 | Heyer | Mar. 5, 1935 |
| 2,024,460 | Lewellen | Dec. 17, 1935 |
| 2,074,997 | Faltermeyer | Mar. 23, 1937 |
| 2,168,744 | Perrine | Aug. 8, 1939 |
| 2,183,267 | Rieser | Dec. 12, 1939 |
| 2,185,435 | Goepfrich | Jan. 2, 1940 |
| 2,238,841 | Allgeyer | Apr. 15, 1941 |
| 2,336,002 | Everett | Dec. 7, 1943 |
| 2,347,479 | Higgins | Apr. 25, 1944 |
| 2,534,943 | Bergenson | Dec. 19, 1950 |

FOREIGN PATENTS

| Number | Country | Date |
|---|---|---|
| 72,542 | Switzerland | June 2, 1916 |
| 202,332 | Great Britain | Aug. 13, 1923 |